(12) United States Patent
Meribout et al.

(10) Patent No.: US 11,745,121 B2
(45) Date of Patent: Sep. 5, 2023

(54) INLINE DEMULSIFICATION DEVICE

(71) Applicants: Khalifa University of Science and Technology, Abu Dhabi (AE); Abu Dhabi National Oil Company, Abu Dhabi (AE)

(72) Inventors: Mahmoud Meribout, Abu Dhabi (AE); Lyes Khezzar, Abu Dhabi (AE); Nabil Kharoua, Constantine (DZ); Esra Al Hosani, Abu Dhabi (AE)

(73) Assignees: Khalifa University of Science and Technology, Abu Dhabi (AE); Abu Dhabi National Oil Company, Abu Dhabi (AE)

(*) Notice: Subject to any disclaimer, the term of this patent is extended or adjusted under 35 U.S.C. 154(b) by 0 days.

(21) Appl. No.: 17/640,911

(22) PCT Filed: Sep. 2, 2020

(86) PCT No.: PCT/IB2020/058183
§ 371 (c)(1),
(2) Date: Mar. 7, 2022

(87) PCT Pub. No.: WO2021/044317
PCT Pub. Date: Mar. 11, 2021

(65) Prior Publication Data
US 2022/0258074 A1    Aug. 18, 2022

Related U.S. Application Data

(60) Provisional application No. 62/896,160, filed on Sep. 5, 2019.

(51) Int. Cl.
*B01D 19/00*    (2006.01)
*B01D 17/04*    (2006.01)
*B01D 17/12*    (2006.01)

(52) U.S. Cl.
CPC ....... *B01D 19/0078* (2013.01); *B01D 17/047* (2013.01); *B01D 17/12* (2013.01); *B01D 19/0063* (2013.01)

(58) Field of Classification Search
CPC ......... B01D 19/00; B01D 17/04; B01D 17/12
See application file for complete search history.

(56) References Cited

U.S. PATENT DOCUMENTS 5,563,346 A    10/1996    Bartelt et al.
6,624,539 B1    9/2003    Hansen et al.
(Continued)

FOREIGN PATENT DOCUMENTS

CN    201031191 Y    3/2008
CN    101564604 A    10/2009
(Continued)

OTHER PUBLICATIONS

JPH1066802A_English (Year: 1998).*
(Continued)

*Primary Examiner* — Youngsul Jeong
(74) *Attorney, Agent, or Firm* — Billion & Armitage

(57) ABSTRACT

Embodiments of the present disclosure describe an inline demulsification system (400, 430) including an inline flow conditioner (402, 410) for separating a multiphase fluid into a liquid phase (420) and a gas phase (422), wherein the liquid phase (420) includes an emulsion; and an ultrasonic wave device (404), provided downstream from the flow conditioner (402, 410), including one or more ultrasonic probes (442) for emitting ultrasonic waves (452) towards the multiphase fluid, wherein the ultrasonic waves (452) demulsify at least a portion of the emulsion. Embodiments of the present disclosure also describe related systems and methods.

20 Claims, 12 Drawing Sheets

(56) References Cited

U.S. PATENT DOCUMENTS

| | | |
|---|---|---|
| 6,872,239 B2 | 3/2005 | Nilsen et al. |
| 7,157,058 B2 | 1/2007 | Marhasin et al. |
| 8,409,426 B2 | 4/2013 | Cullen |
| 8,729,440 B2 | 5/2014 | Parsche |
| 9,031,797 B2 | 5/2015 | Huang et al. |
| 9,555,345 B2 | 1/2017 | Al-Shafei et al. |
| 9,932,526 B2 | 4/2018 | Rout |
| 10,260,007 B2 | 4/2019 | Barroeta et al. |
| 10,309,432 B2 | 6/2019 | Reckner et al. |
| 2004/0016299 A1 | 1/2004 | Glascock et al. |
| 2004/0031731 A1 | 2/2004 | Honeycutt et al. |
| 2004/0050166 A1 | 3/2004 | Batzinger et al. |
| 2007/0272618 A1* | 11/2007 | Gou ............... B01D 17/04 516/113 |
| 2009/0111360 A1 | 4/2009 | Miyamoto |
| 2010/0299088 A1 | 11/2010 | Huang et al. |
| 2011/0285244 A1 | 11/2011 | Lewis et al. |
| 2016/0052846 A1 | 2/2016 | Gooding et al. |
| 2018/0187095 A1 | 7/2018 | Soliman |
| 2019/0111360 A1 | 4/2019 | Hanna et al. |

FOREIGN PATENT DOCUMENTS

| | | | | |
|---|---|---|---|---|
| CN | 101829439 A | | 9/2010 | |
| CN | 105372568 A | * | 3/2016 | ............. G01N 29/34 |
| CN | 107957005 A | | 4/2018 | |
| CN | 208320061 U | | 1/2019 | |
| JP | H1066802 A | * | 3/1998 | ............. B01D 19/00 |
| JP | H1066802 A | | 3/1998 | |
| WO | 2012055009 A1 | | 5/2012 | |

OTHER PUBLICATIONS

CN-105372568-A_English (Year: 2016).*
International Search Report and the Written Opinion for PCT Application No. PCT/IB2020/058183, dated Sep. 21, 2020, 10 pages.

* cited by examiner

INLINE DEMULSIFICATION DEVICE

BACKGROUND

In oil fields, produced crude oil which is typically mixed with water and gas is extracted from several wells and then aggregated in a gathering manifold. With water injection-based EOR and field aging, the amount of water mixed with oil (i.e. water-cut) is continuously increasing. The mixing with oil with water, together with mechanical mixing due to pumps and large pressure drops across valves and chokes, generates a substantial amount of a tight emulsion phase comprising a water-oil mixture. Thus, de-emulsifying chemicals are continuously injected into pipeline segments located between the manifolds and the bulk separation tanks in liquid solution to reduce the intensity of the molecular forces between hydrocarbon and water molecule within the emulsion. Cascades of one or more downstream storage tanks are then used to achieve further separation by gravity. The disadvantages of this process is that it is costly, is not environmentally friendly, and requires a long settling time in the storage tanks which causes a substantial decrease of oil production throughput. This remains a critical challenge for most oil producing companies which are under constant pressure to target a substantial production increase in the future. Furthermore, the process does not guarantee complete oil-water separation, leading potentially to severe corrosion in oil-carrying pipelines for water concentration exceeding 2%. This is also critical in other downstream processes, including for example heat exchanges, which require reuse of good-quality water, where the presence of a small amount of an oil phase may cause the creation of plugs and fouling, leading to energy losses in stripper trays and/or in re-injection facilities.

SUMMARY OF THE INVENTION

In one or more aspects of the invention, an inline demulsification system may include an inline flow conditioner for separating a multiphase fluid into a liquid phase and a gas phase, wherein the liquid phase includes an emulsion; and an ultrasonic wave device, provided downstream from the flow conditioner, including one or more ultrasonic probes for emitting ultrasonic waves towards the multiphase fluid, wherein the ultrasonic waves demulsify at least a portion of the emulsion.

In one or more further aspects of the invention, an in-line demulsification system may include one or more of the following: at least one inline ultrasonic wave device including one or more ultrasonic probes for emitting ultrasonic waves towards a multi-phase fluid, wherein the multiphase fluid includes a liquid phase and a gas phase, wherein the liquid phase includes an emulsion, and wherein the ultrasonic waves demulsify at least a portion of the emulsion; an in-line flow conditioner provided upstream from the at least one ultrasonic wave device for adjusting a flow profile of the multiphase fluid, wherein the inline flow conditioner receives the multiphase fluid with a first flow profile and discharges the multiphase fluid with a second flow profile; at least one sensor for measuring and transmitting one or more signals containing data representing one or more properties of the multiphase fluid; and a processor/controller for receiving the one or more signals from the at least one sensor and, in response thereto, adjusting one or more of a power of ultrasonic waves to be emitted, adjusting an amount of one or more chemicals to be injected into the multi-phase mixture, and selecting one or more chemicals to be injected into the multi-phase mixture.

In one or more further aspects of the invention, a method of demulsifying one or more multiphase mixtures is provided. The method may include one or more of the following steps: flowing a multiphase fluid including a gas phase and a liquid phase through an inline flow conditioner to separate the gas phase and the liquid phase, wherein the liquid phase includes an emulsion; emitting ultrasonic waves towards the multiphase fluid to demulsify at least a portion of the emulsion.

The details of one or more examples are set forth in the description below. Other features, objects, and advantages will be apparent from the description and from the claims.

BRIEF DESCRIPTION OF THE DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which.

DETAILED DESCRIPTION

Figure 1:
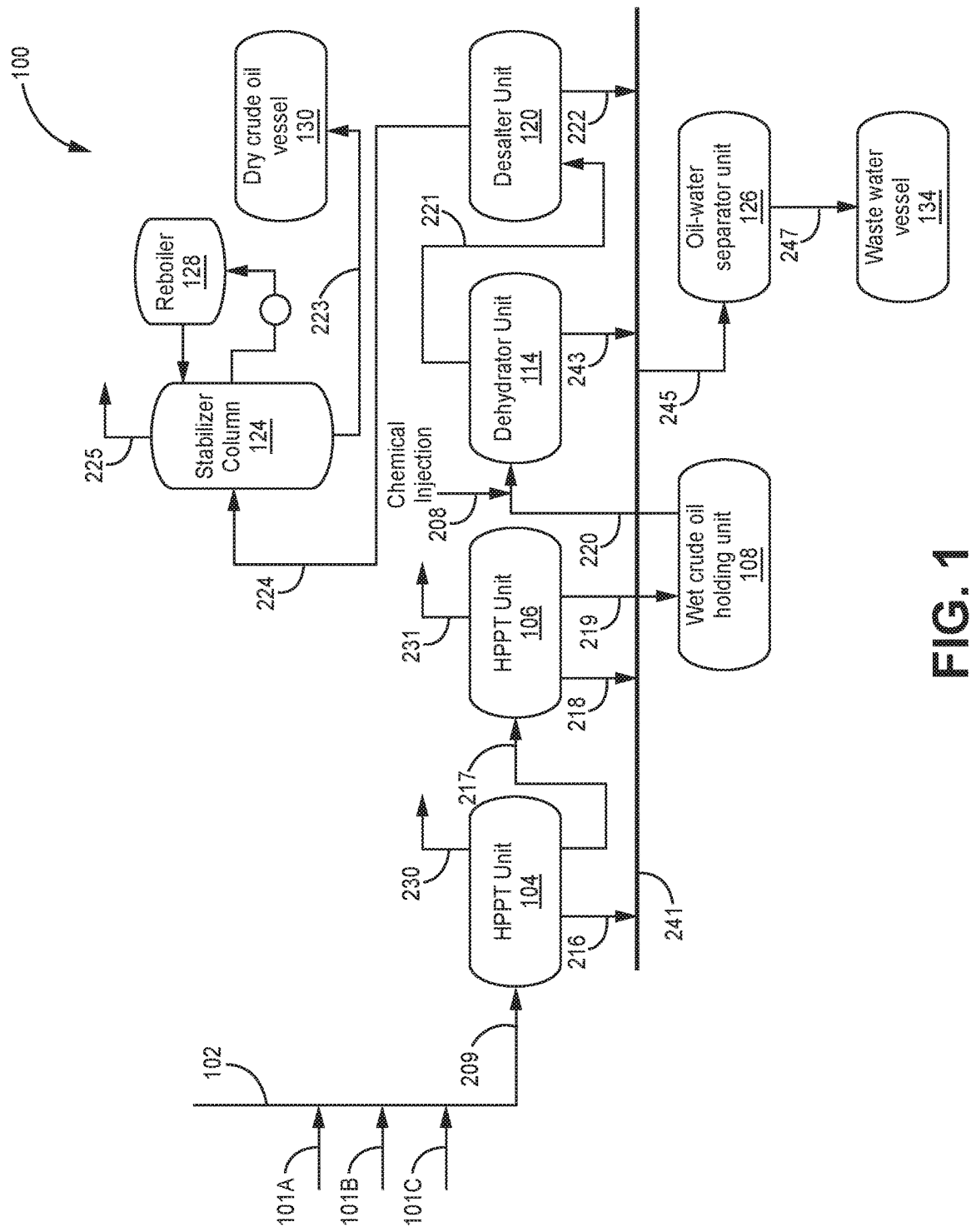
FIG. 1 is a schematic diagram of a conventional gas oil separation system and method for processing crude oil from production wells, according to one or more embodiments of the invention.

Inline demulsification systems and methods for breaking tight emulsions (e.g., emulsions having small and closely distributed droplets) are disclosed herein. The inline demulsification systems may include an ultrasonic wave device that is used to generate high power ultrasonic waves, on a continuous and/or intermittent basis, that propagate towards an emulsion (e.g., of a multiphase fluid) flowing through a conduit, such as an oil-gas emulsion flowing in pipeline in an oil-gas field. The ultrasonic wave device may be easily installed on piping with clamps, among other means, to permit ready-integration with existing systems and removal for modification and maintenance. Demulsification may be achieved by utilizing the mechanical energy embodied in the propagating ultrasonic waves to destabilize the emulsifying film formed around droplets of the dispersed phase and promote coalescence thereof until the emulsion separates into its component phases. Since ultrasonic waves may be highly attenuated in liquids containing gas, performance of the inline demulsification systems can be improved for multiphase fluids by providing an inline flow conditioner upstream (e g, immediately upstream) from the ultrasonic wave device to adjust the flow profile of the multiphase fluid before demulsification and/or to separate a liquid phase and a gas phase of the multiphase fluid. The inline demulsification systems can operate autonomously or in combination with controllers to adjust operating parameters of the ultrasonic wave device and other unit operations in real-time in response to measurements obtained from sensors.

In accordance with one or more embodiments of the invention, one or more inline power ultrasonic wave devices including one or more ultrasonic probes (and optionally a generator or power supply) may be installed in one or more locations in the pipeline within an oil-gas field to break a tight oil-water emulsion. The one or more ultrasonic wave devices may substitute and/or operate simultaneously with exiting chemical injection facilities. In some embodiments, the inline ultrasonic wave devices are installed immediately upstream of the dehydrating vessel, desalting unit, and/or separation unit. The inline ultrasonic probe may generate continuous or intermittent high power ultrasonic waves towards an emulsion medium which may be present in a multiphase fluid. Since ultrasonic waves may be highly attenuated within the liquid phase when a gas phase is present, an inline flow conditioner that separates liquid and gas phases may be placed immediately upstream of the inline ultrasonic wave device and/or one or more ultrasonic probes to mitigate losses of ultrasonic power in the liquid phase, Depending on the flow rate, the flow conditioner can generate either a stratified flow, or preferably an annular flow with a gas core surrounded by the liquid phase. The flow conditioner can be easily designed using a swirl generating device. The ultrasonic power probe can work either autonomously or associated to one or several inline water-cut meters to tune the intensity of ultrasonic power accordingly. For instance, the ultrasonic power needs to be raised in case the amount of oil in the water line or the amount of water in the oil line exceeds a predefined threshold, reflecting that the amount of the emulsion is still significant. The inline demulsification systems disclosed herein provide environmental and economical advantages (e.g., from a cost perspective) to existing solutions, including, for example and without limitation, chemical injection-based demulsification systems and methods. In addition to being used in the oil and/or gas industry (e.g., upstream oil industry), the inline demulsification systems may be used in the petrochemical and food industries where de-emulsification process is also required.

A multiphase fluid and/or a multiphase mixture may include a liquid phase and a gas phase. The liquid phase may include an emulsion. An emulsion may include a mixture of two or more liquids that are normally immiscible (nonmixable or unblendable). Emulsions are generally part of a more general class of two-phase systems of matter called colloids. Although the terms "colloid" and "emulsion" are sometimes used interchangeably, "emulsion" is used when both the dispersed and the continuous phase are liquids and not a solid. In an emulsion, one liquid (the dispersed phase) is dispersed in the other (the continuous phase). Examples of emulsions include vinaigrettes, milk, mayonnaise, cutting fluids for metal working, fermentation broths and the like. Examples of a colloid include the photo-sensitive side of photographic film. Two liquids can form different types of emulsions. As an example, oil and water can form, firstly, an oil-in-water emulsion, where the oil is the dispersed phase, and water is the dispersion medium. Secondly, they can form a water-in-oil emulsion, where water is the dispersed phase and oil is the external phase. Multiple emulsions are also possible, including a "water-in-oil-in-water" emulsion and an "oil-in-water-in-oil" emulsion. Emulsions contain both a dispersed and a continuous phase, with the boundary between the phases called the "interface". Emulsions may be stable or unstable. Whether an emulsion of oil and water turns into a "water-in-oil" emulsion or it turns into an "oil-in-water" emulsion depends on the volume fraction of both phases.

Demulsification, emulsion breaking, and other similar terms may refer to separating emulsions (e.g., oil in water or water in oil) into separate phases (e.g., separate and/or distinct phases). For example, an emulsion of oil and water, once demulsified, may separate into an oil phase and a water phase of varying extent (e.g., there may be some portion of an emulsion that remains, or the emulsion may be completely broken). There are three types of instability in emulsions which may be used to characterize or describe the breaking process or demulsification process: flocculation, creaming, and coalescence. Flocculation describes the process by which the dispersed phase comes out of suspension in the form of flakes. Coalescence is another form of instability—small droplets bump into each other within the media volume and continuously combine to form progressively larger droplets. Emulsions can also undergo creaming, where one of the substances migrates to the top (or the bottom, depending on the relative densities of the two phases) of the emulsion under the influence of buoyancy, or under the influence of the centripetal force induced when a centrifuge is used.

FIG. 1 is a schematic diagram of a conventional gas oil separation system and method for processing crude oil from production wells to provide context for an implementation of the present invention. As shown in FIG. 1, the conventional gas oil separation system and method 100 may include a manifold 102 in which crude oil (e.g., mixtures of oil, water, gas, and other components, such as sand) from one or more production wells 101A, 101B, 101C is aggregated or collected into a single channel for distribution to downstream unit operations for processing. Since the wells may be at different pressures, the manifold 102 may comprise or may be in communication with valve arrangements (not shown) for regulating the contributions from each individual well 1. In some embodiments, a high-pressure production trap (HPPT) 104 is fluidly connected to the manifold 102 via conduit 209. The HPPT 104 may be configured to operate at high pressures (e.g., about 200 PSIG) and temperatures (e.g., about 80° C.). The HPPT 104 may include an exit stream 216 which is fluidly connected to conduit 241 and another exit stream 230. An exit stream 217 may fluidly connect HPPT unit 104 to unit 106.

The unit 106 may include a low-pressure production trap (LPPT) 106. The LPPT 106 may be fluidly connected to the HPPT 104 and may be configured to operate at comparatively lower pressures (e.g., about 70 PSIG) and similar temperatures (e.g., about 80° C.). The LPPT 106 may include an exit stream 231. In addition, an exit stream 218 may fluidly connect the LPPT 106 to conduit 241. An exit stream 219 may fluidly connect the LPPT 106 a wet crude oil holding vessel 108. Wet crude oil from the LPPT 106 may include large proportions of oil-water emulsions, which typically include from about 30% to about 40% water cut, and salt, at least a portion of which may be stored in a wet crude oil holding vessel 108. Wet crude oil from the wet crude oil holding vessel 108 may be directed to a downstream staged separation system via conduit 220 for further separation and washing using, for example, centrifugal pumps. In some embodiments, a chemical injection port 208 is provided downstream from the wet crude oil holding vessel 108.

In some embodiments, the staged separation system includes a three-stage separation system. The three-stage separation system may include a dehydrator unit 114, a desalter unit 120, and an oil-water separator unit 126. The dehydrator unit 114 may produce gas that is transferred to a compression processing unit (not shown), water that is transferred to a water treatment plant (not shown), and oil, optionally with some water, that is transferred to a desalter unit 120. The produced gas, water, and oil may be produced in separate streams. As shown, the dehydrator unit 114 may include exit stream 243 fluidly connected to conduits 241 and 245. The dehydrator unit 114 may be fluidly connected to the desalter unit 120 via conduit 221. The desalting unit 120 may include exit stream 222 fluidly connected to conduit 241. A portion of the oil extracted from the desalting unit 120 may be transferred to a stabilizer column 124 via conduit 224, which includes one or more trays. The stabilizer column 124 may receive a portion of the wet oil which then flows down over a cascade of trays until it reaches a draw-off tray where it is heated by a boiler 128 to produce dry oil which may be transferred to a dry crude oil vessel 130 via conduit 223. The stabilizer column 124 may also produce hydrogen sulfide and light hydrocarbons which may be removed as a gas stream 225 from the stabilizer column 124. The oil-water separator unit 126 may be used to perform further oil-water separation. Wastewater from the oil-water separator unit 128 may be transferred to wastewater vessel 134 via conduit 247 for further processing, for example, for water-based EOR. Chemical injection may be performed immediately upstream the dehydrating unit 114, in the desalting unit 120, and/or the oil-water separator unit 126.

Although not shown, in addition to the units discussed above, the conventional gas oil separation system and method may further include one or more of boilers, condensers, separation pumps, heat exchangers, mixing valves for injecting emulsification chemicals, skimmers for stabilizing the emulsion, and other units known in the art. The conventional gas oil separation system and method of FIG. 1 shall not be limiting as other conventional gas oil separation systems and methods may be equipped with the inline demulsification systems (to be discussed in more detail below) without departing from the scope of the present invention. For example, any of the gas oil separation plants disclosed in U.S. Publication Application No. 2018/0187095 A1 may be utilized herein and thus is within the scope of the present invention.

Figure 2:
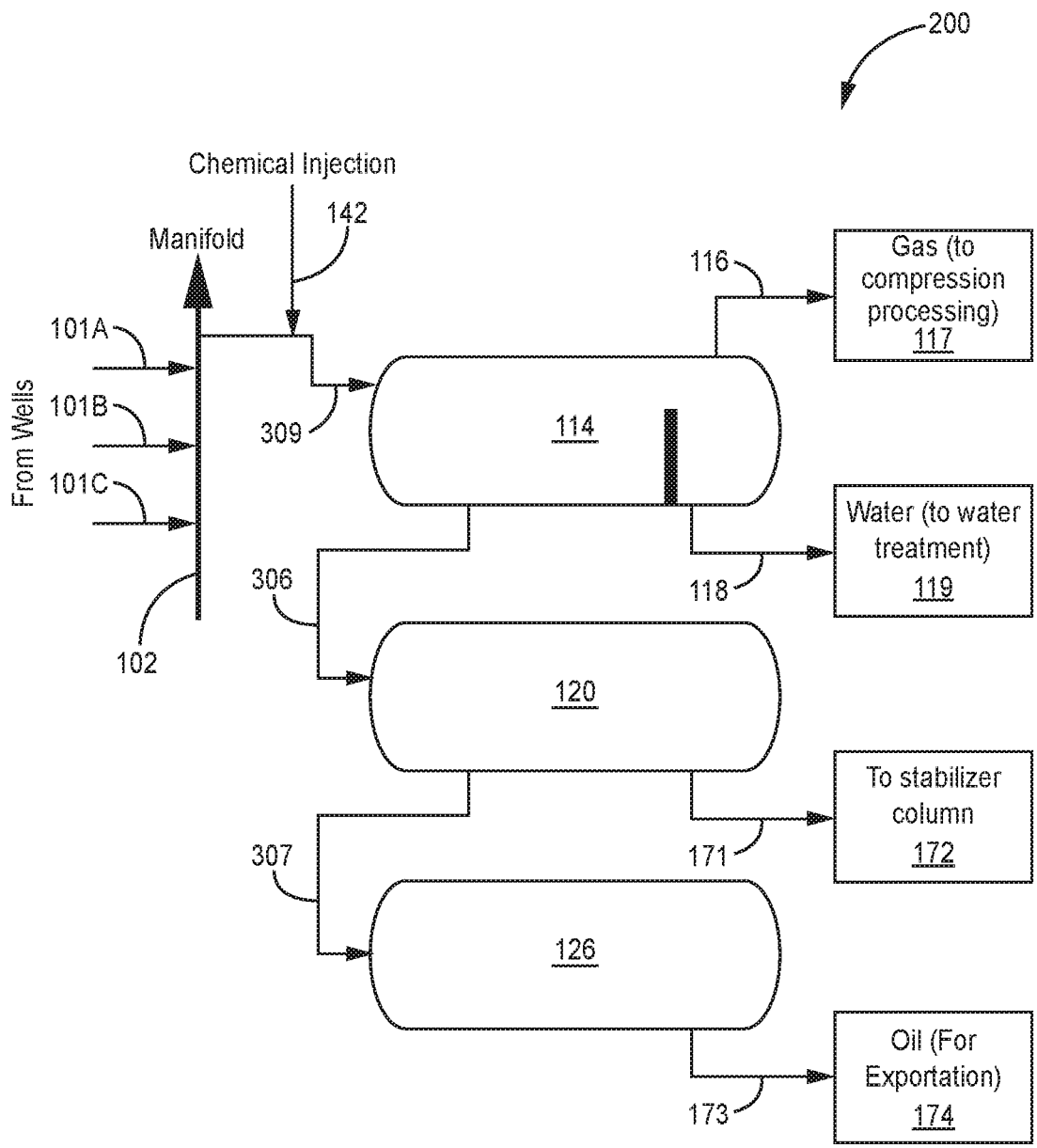
FIG. 2 is an enlarged schematic diagram of the three-stage separation system from a conventional gas oil separation system and method, such as the conventional gas oil separation system and method of FIG. 1, according to one or more embodiments of the invention.

FIG. 2 is an enlarged schematic diagram of the three-stage separation system from a conventional gas oil separation system and method, such as the conventional gas oil separation system and method 100. As shown in FIG. 2, the three-stage separation system 200 includes a manifold 102 in which crude oil from one or more production wells 101A, 101B, 101C is aggregated. A dehydrator unit 114 may be located downstream from and fluidly connected to the manifold 102 via conduit 309. A chemical injection port 142 for demulsifying fluids, such as multiphase fluids, may be located between the manifold 102 and the dehydrator unit 114. A gas stream 116 may exit from the dehydrator unit 114. The gas stream 116 may be fluidly connected to a compression processing unit 117. A water stream 118 may also exit from the dehydrator unit 114. The water stream 118 may be fluidly connected to a water treatment plant 119. A desalter unit 120 may be fluidly connected to and located downstream from the dehydrator unit 114 via conduit 306. An exit stream 171 from the desalter unit 120 may be fluidly connected to a stabilizer column 172. An oil-water separation unit 126 may be fluidly connected and located downstream from the desalter unit 120 via conduit 307. An exit stream 173 from the oil-water separation unit 126 may be fluidly connected to a holding vessel 174.

Figure 3:
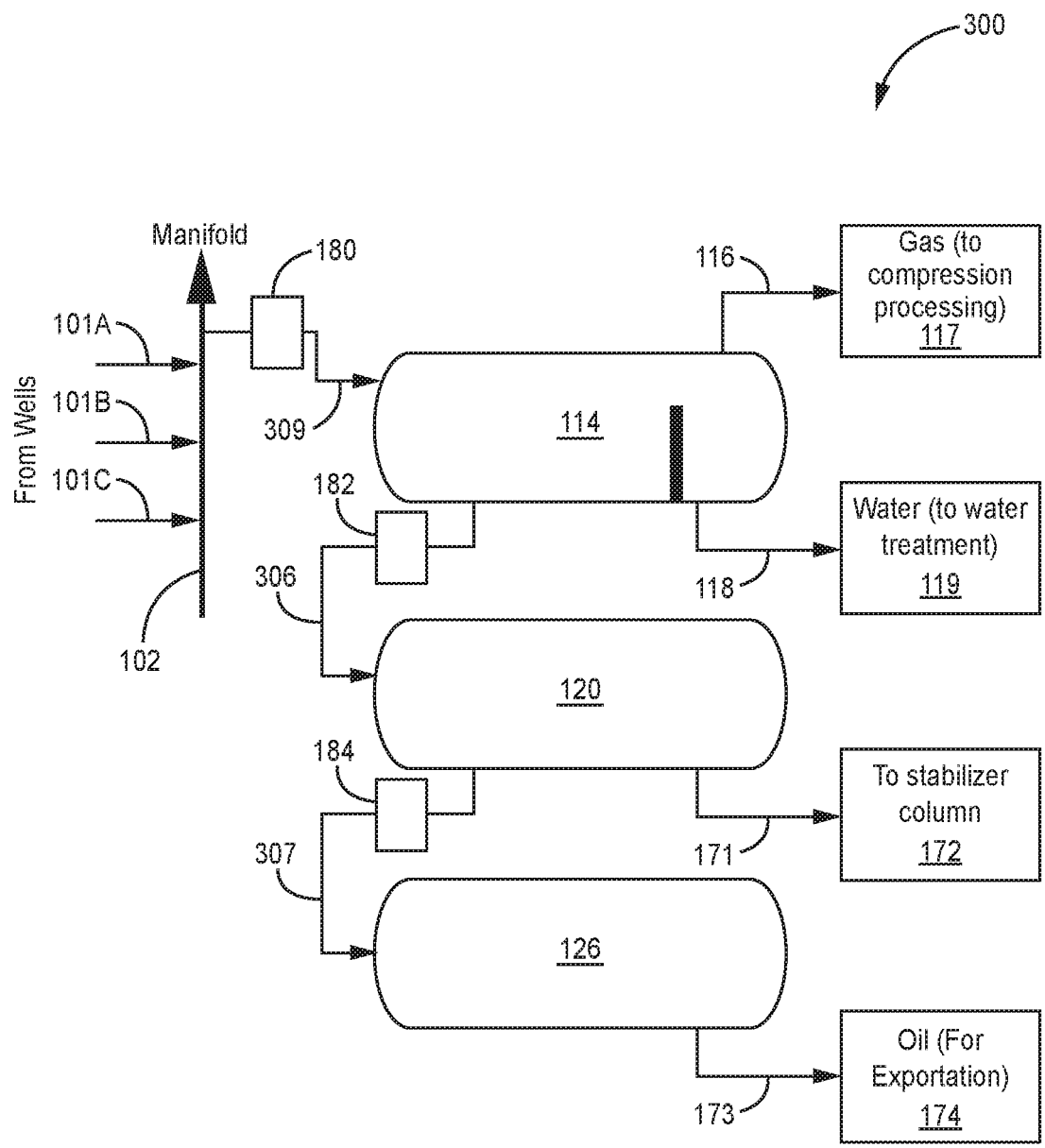
FIG. 3 is a schematic diagram showing the three-stage separation system including one or more inline demulsification systems of the present invention, according to one or more embodiments of the invention.

FIG. 3 is a schematic diagram showing the three-stage separation system 200 including one or more inline demulsification systems of the present invention, according to one or more embodiments of the invention. As shown in FIG. 3, one or more inline demulsification systems 180, 182, 184 may be installed in one or more locations of a pipeline of an oil-gas separation system and method, such as the conventional oil-gas separation system and method 100, including the three-stage separation system 200, described above. For example, in some embodiments, the inline demulsification system 300 may be installed upstream (e.g., immediately upstream) the dehydrating unit 114 and/or downstream the manifold 102. Although not shown, in some embodiments, the inline demulsification system may substitute an existing chemical injection device, and/or work in tandem with the existing chemical injection device. In some embodiments, the inline demulsification system 300 is installed upstream the desalting unit 120 and/or downstream the dehydrating unit 114. In some embodiments, the inline demulsification system 300 is installed upstream the gas-oil separation unit 126 and/or downstream the desalting unit 120. In addition to the gas oil separation system and methods, the inline demulsification system 300 may be installed in industries other than the oil industry, such as the petrochemical industry, food industry, and/or any other industry in which demulsification process is desired and/or required.

In some embodiments, demulsification may be affected by, or depend on, the size of the oil droplets in a multiphase mixture. For example, depending on the diameter of oil droplets, D, oil mixed with water may be either free-oil for oil droplets exceeding 150 microns, or within an emulsion for oil droplets smaller in size. The settling velocity, $v_s$, which measures the velocity of oil-water separation within a tank having a water of density, $\rho_w$, and oil droplets of density, $\rho_O$, may be approximated using the Stoke's equation presented below:

$$v_s = \frac{gD^2(\rho_0 - \rho_w)}{18\mu}$$

where µ is the absolute viscosity and g the gravitational acceleration. From the above equation, it may be deduced that coalescence of oil droplets may be required to speed-up the demulsification process. On the other hand, mechanical mixings such as pumps and chokes tend to decrease the diameter of oil droplets, D, which makes oil extremely difficult to extract from the emulsion medium.

Figure 4:
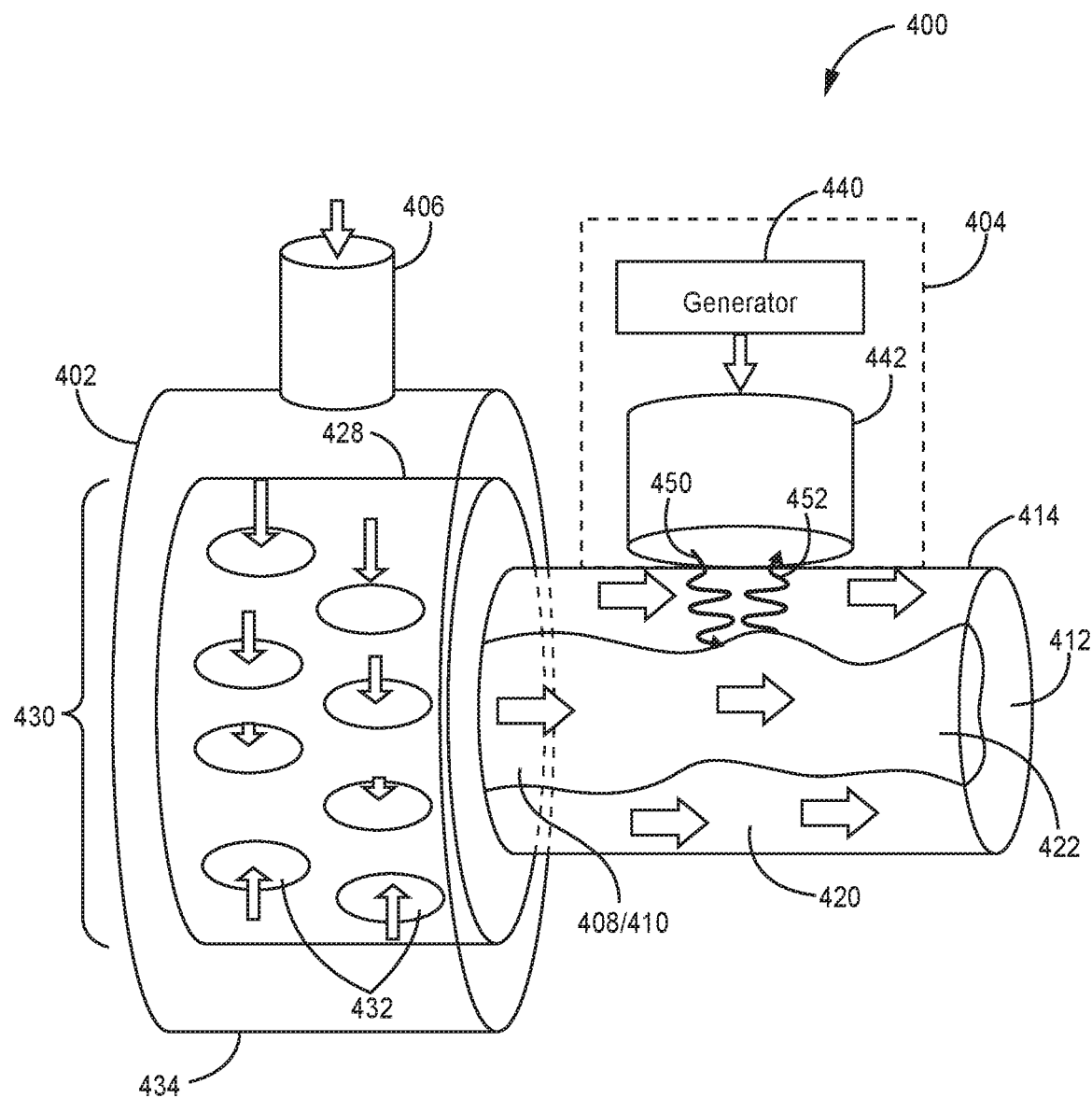
FIG. 4 is a schematic diagram of an inline demulsification system and method, according to one or more embodiments of the invention.

FIG. 4 is a schematic diagram of an inline demulsification system and method 400, according to one or more embodiments of the invention. The inline demulsification system 400 may include an ultrasonic wave device 404 for emitting ultrasonic waves 429 (e.g., high power ultrasonic waves) towards a multiphase fluid flowing through, for example, a conduit or pipeline. Mechanical energy stored in the propagating ultrasonic waves may destabilize an emulsifying film formed around droplets of the dispersed phase and promote coalescence thereof until the emulsion separates into its component phases. For example, the emitted ultrasonic waves may demulsify or break tight oil-water emulsion, among other multiphase fluids. In some embodiments, the ultrasonic waves emitted by the ultrasonic wave device 404 may be highly attenuated within a liquid phase when a gas phase is present in the multiphase fluid. Accordingly, in some embodiments, an inline flow conditioner 410 may be provided upstream (e.g., immediately upstream) from the ultrasonic wave device 404. The inline flow conditioner 410 may be used to separate the liquid phase from the gas phase of the multiphase fluid. In this way, the inline flow conditioner may be used to mitigate losses of ultrasonic power within the liquid phase.

In some embodiments, the inline demulsification system 400 may include an inline flow conditioner 402. The inline flow conditioner 402 may include a multiphase inlet 406 and a swirl generating device 430 for changing a flow profile of the multiphase fluid, including a gas phase 422 and a liquid phase 420, from a first flow profile to a second flow profile. The swirl generating device 430 may include a hollow rod 428 including one or more, or a plurality, of orifices 432. In some embodiments, the one or more orifices 432 may be referred to as small inclined holes. The hollow rod 428 may be fixed inside a cylindrical compartment 434 having an opening 406 from which it receives the multiphase inflow. The ultrasonic wave device 404 may be provided proximal to an outlet 408 of the inline flow conditioner 402 (e.g., such that the inline flow conditioner 402 is immediately upstream the ultrasonic wave device 404). In some embodiments, the ultrasonic wave device 404 includes one or more ultrasonic probes 442, each of which may be coupled to a generator or power supply 440. The one or more ultrasonic probes 442 may be installed on and/or around an outer perimeter or diameter of a conduit 414 which has an inlet 410 and an outlet 412. The one or more ultrasonic probes 442 may emit one or more ultrasonic waves 450 which may be reflected as reflected ultrasonic waves 452.

In some embodiments, a multiphase fluid including a gas phase 422 and a liquid phase 420 may enter the inline demulsification system 400 through multiphase inlet 406. The multiphase fluid may flow through the inline flow conditioner 402 to separate the liquid phase 420 and the gas phase 422 of the multiphase flow. For example, in some embodiments, the inline flow conditioner 402 may be configured to change the flow profile of a multiphase fluid from a first flow profile to a second flow profile. For example, the inline flow conditioner 402 may change a flow profile of a multiphase fluid, wherein the inline flow conditioner 402 receives a multiphase fluid having a first flow profile and discharges the multiphase fluid having a second flow profile. The first flow profile is usually one in which the gas phase 422 and liquid phase 420 (e.g., the oil-water emulsion) are not separated. As the multiphase mixture flows through the flow conditioner 30, the flow profile is adjusted to a second flow profile in which the gas phase 422 and liquid phase 420 are at least partially separated, thereby mitigating ultrasonic power losses due to attenuation. The second flow profile can depend on the flow rate or flow velocity of the multiphase mixture through the flow conditioner 402. If the flow rate is sufficiently low, the multiphase mixture can exit the flow conditioner 402 with a stratified flow profile or a distribution in which the liquid phase 420 occupies a lower portion of the pipe and the gas phase 422 occupies an upper portion of the pipe (not shown). If the flow rate is increased, the multiphase mixture can exit the flow conditioner 402 with an annular flow profile or a distribution in which the liquid phase 420 surrounds an approximately cylindrical gas core 422.

Upon exiting the inline flow conditioner 402, the multiphase fluid having the second flow profile flows through, for example, a conduit or portion of a pipeline 414. As the multiphase fluid having the second flow profile flows through said pipe 414, one or more ultrasonic probes 442 of the ultrasonic wave device 404 may generate continuous and/or intermitting (e.g., pulsing, on-demand, etc.) high power ultrasonic waves towards (e.g., may emit propagating ultrasonic waves) the emulsion medium/multiphase fluid flowing through the pipeline or conduit 414. The emitted ultrasonic waves 450 may create oscillating mechanical waves which break water-oil atomic forces and the interfacial film, thereby increasing the size of oil droplets and making them easier to separate. Accordingly, the propagating ultrasonic waves emitted towards the emulsion medium/multiphase fluid may break or demulsify at least a portion of the emulsion. The emitted ultrasonic waves 450 may also increase the degassing of the soluble hydrogen sulfide ($H_2S$) which has the advantage to let the downstream pipelines and other equipment less prone to corrosion and thus safer. The emitted ultrasonic waves 450 which are emitted by the ultrasonic wave device 404 may also be reflected at the liquid-gas interphase. The ultrasonic waves which are reflected at the liquid-gas interface, among other places, may in turn generates reflected high power ultrasonic waves 452. The reflected optionally high-power ultrasonic waves 452 may further increase the aggregate ultrasonic power and may optionally improve demulsification.

Figure 5:
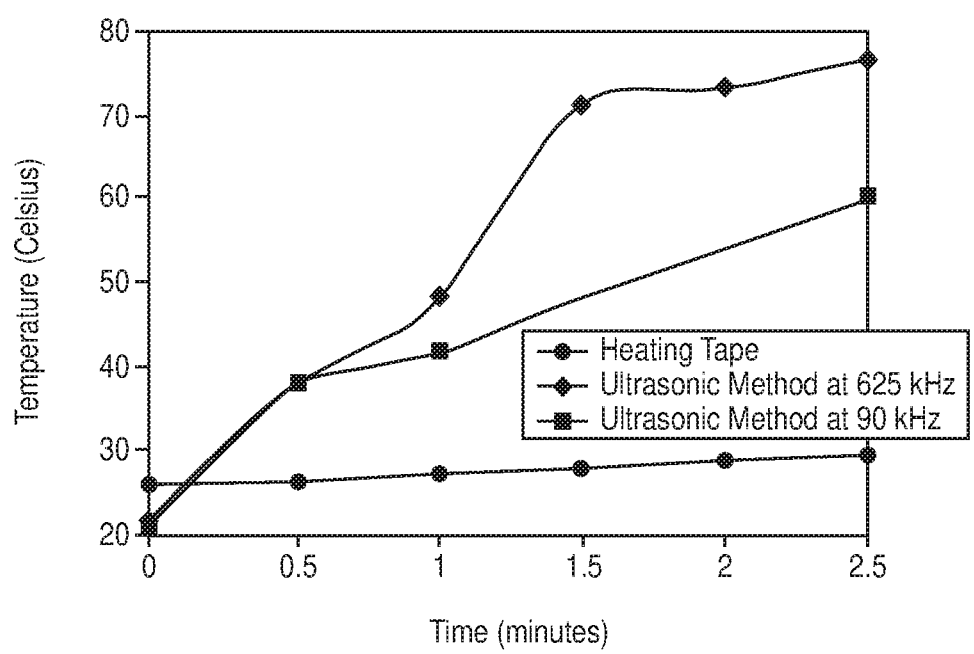
FIG. 5 is a graphical view showing that the temperature of the multiphase fluid increases with corresponding increases in ultrasonic frequency, according to one or more embodiments of the invention.

The one or more ultrasonic probes 442 may be operated at any frequency exceeding 1 kHz, such as between 10 kHz to 1 MHz or greater, and any power exceeding 100 Watts. The selection of the operating frequency may depend on one or more factors, such as the pipeline diameter, thickness of a liquid phase, thickness of gas phase, flow profile of the multiphase fluid, a state or condition of the multiphase mixture downstream/upstream, composition of the multiphase mixture, etc. High frequency waves may yield higher temperatures, and/or faster separation, while decreasing penetration depth. FIG. 5 is a graphical view showing that the temperature of the multiphase fluid increases with corresponding increases in ultrasonic frequency. Accordingly, the operating frequency and/or power may be varied, optionally in response to any one or more of the aforementioned factors. For example, a controller (not shown) may continuously emit ultrasonic waves or it can modulate the intensity of ultrasonic power on an as-needed basis in response to signals received from one or more sensors. Non-limiting examples of suitable sensors include work-cut meters for measuring the amount of oil present in a water line or the amount of water present in an oil line, emulsion sensor probes for producing emulsion layer profiles, and the like.

Although not shown in FIG. 4, the inline demulsification system may further include one or more sensors for monitoring, measuring, and/or determining one or more properties of the multiphase fluid. In some embodiments, the one or more sensors generate an output signal related to a sensed property and/or property to be sensed and the output signal, or data, is communicated to a controller and/or processor, where the one or more communicated output signals may be processed and/or analyzed to determine one or more properties of the multiphase fluid. For example, in some embodiments, one or more sensors are used for communicating (e.g., transmitting) data (e.g., signals) representing one or more properties of the multiphase fluid to the controller. IN some embodiments, the one or more sensors are used for communicating data representing a water content of a discharge stream from a downstream unit operation, an oil content of a discharge stream from a downstream unit operation, or an oil-water distribution within a downstream unit operation. In some embodiments, the one or more sensors include one or more water-cut sensors for communicating data representing the amount of oil and/or water present in the multiphase fluid and/or oil and/or water. In some embodiments, the one or more sensors include one or more emulsion sensor probes for communicating data representing an emulsion layer profile to the controller. In some embodiments, the one or more emulsion sensor probes measure the oil-water distribution within a unit operation.

In some embodiments, the controller is configured to receive data/signals from the one or more sensors and/or transmit data/signals to one or more of the ultrasonic wave device, a control valve of a chemical injection port, etc. For example, in some embodiments, the controller is configured to control/adjust the power of the ultrasonic waves emitted by the one or more ultrasonic probes of the ultrasonic wave device in response to input from the one or more sensors. In some embodiments, the power (and/or frequency) of the ultrasonic waves is increased or decreased if the amount of oil in the water line exceeds a predetermined threshold. In some embodiments, the power (and/or frequency) of the ultrasonic waves is increased or decreased if the amount of water in the oil line exceeds a predetermined threshold. In some embodiments, the controller is configured to control/adjust the injection of one or more chemicals in response to input from the one or more water-cut sensors. In some embodiments, the controller is configured to control/adjust the power of the ultrasonic waves emitted by the ultrasonic wave of the ultrasonic wave device in response to input from the one or more emulsion sensor probes. In some embodiments, the controller is configured to, in response to one or more signals or data from the one or more sensors or in response to user operation, control and/or adjust one or more of a power of ultrasonic waves to be emitted, adjusting an amount of one or more chemicals to be injected into the multi-phase mixture, and selecting one or more chemicals to be injected into the multi-phase mixture.

Figure 6:
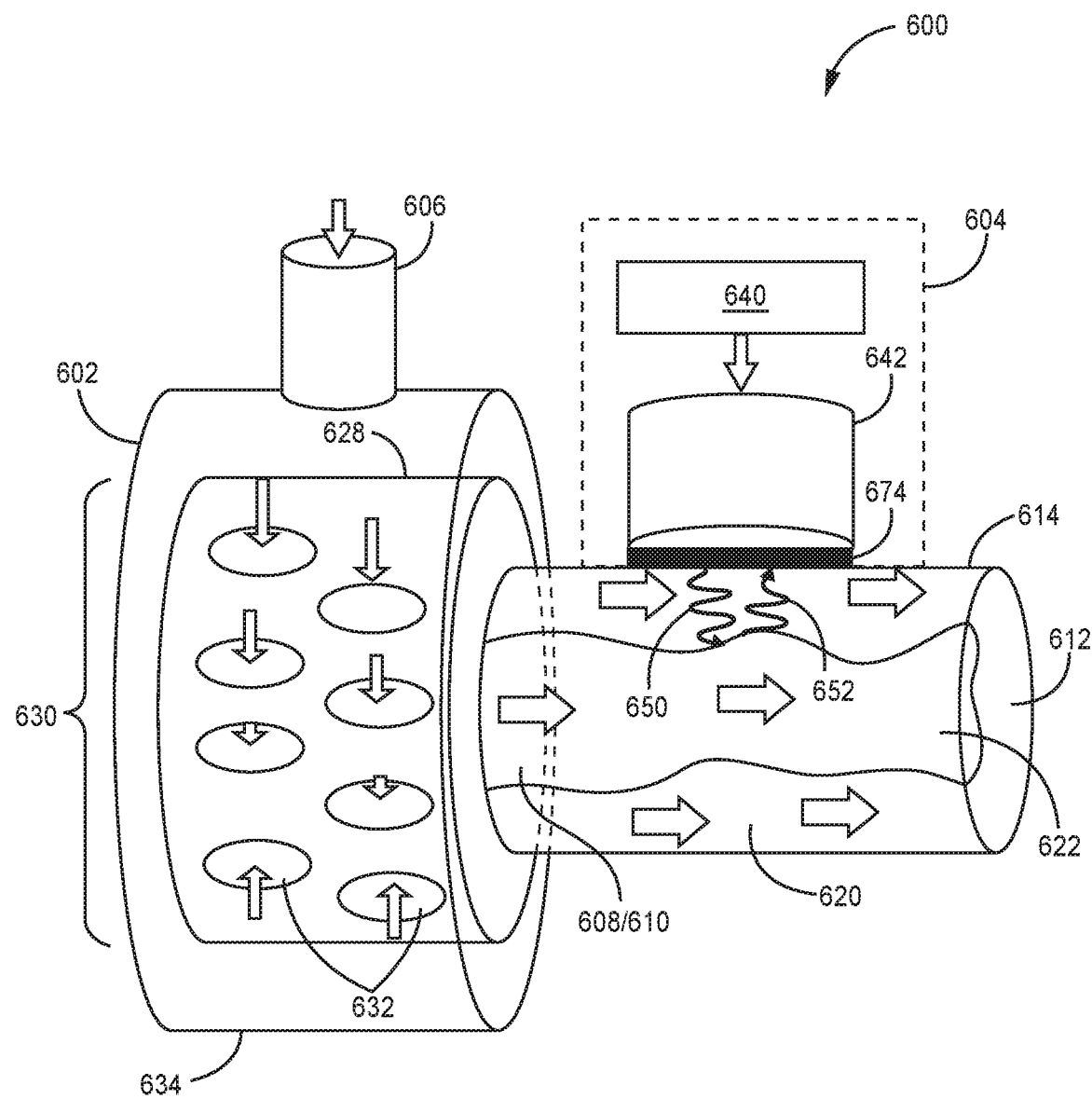
FIG. 6 is a schematic diagram of a readily accessible inline demulsification system and method which may be clamped onto a conduit or pipe, according to one or more embodiments of the invention.

At least one advantage of the inline demulsification systems of the present disclosure, at least in comparison to, for example, conventional demulsification devices and/or techniques, including inline microwave demulsification devices, is that the ultrasonic probes of the inline demulsification systems of the present disclosure may be clamped-on the pipeline which makes the inline demulsification systems of the present disclosure readily accessible, permitting maintenance, modifications (e.g., of the number and type of ultrasonic probes to be deployed downstream the flow conditioner), and the like with ease. For example, microwave-based demulsification devices cannot, for example, be clamped on because the pipe is usually made of steel which is a high absorber of RF waves. FIG. 6 is a schematic diagram of a readily accessible inline demulsification system and method 600 which may be clamped onto a conduit or pipe, according to one or more embodiments of the invention. As shown in FIG. 6, a matching layer 674 may be provided between one or more ultrasonic probes to maximize the transfer of power ultrasonic wave into the flowing liquid phase of the multiphase fluid. For example, in some embodiments, the matching layer 674 may be provided between the ultrasonic probe and the pipe 20 to maximize transmission of the ultrasonic energy from the ultrasonic device to the oil-water emulsion and/or to prevent unwanted reflections.

In some embodiments, the inline demulsification system 600 may include an inline flow conditioner 602. The inline flow conditioner 602 may include a multiphase inlet 606 and a swirl generating device 630 for changing a flow profile of the multiphase fluid, including a gas phase 622 and a liquid phase 620, from a first flow profile to a second flow profile. The swirl generating device 630 may include a hollow rod 628 including one or more, or a plurality, of orifices 632. In some embodiments, the one or more orifices 632 may be referred to as small inclined holes. The hollow rod 628 may be fixed inside a cylindrical compartment 634 having an opening 606 from which it receives the multiphase inflow. The ultrasonic wave device 604 may be provided proximal to an outlet 608 of the inline flow conditioner 602 (e.g., such that the inline flow conditioner 602 is immediately upstream the ultrasonic wave device 604). In some embodiments, the ultrasonic wave device 604 includes one or more ultrasonic probes 642, each of which may be coupled to a generator or power supply 640. The one or more ultrasonic probes 642 may be installed on and/or around an outer perimeter or diameter of a conduit 614 which has an inlet 610 and an outlet 612. The one or more ultrasonic probes 642 may emit one or more ultrasonic waves 650 which may be reflected as reflected ultrasonic waves 652.

Figure 7:
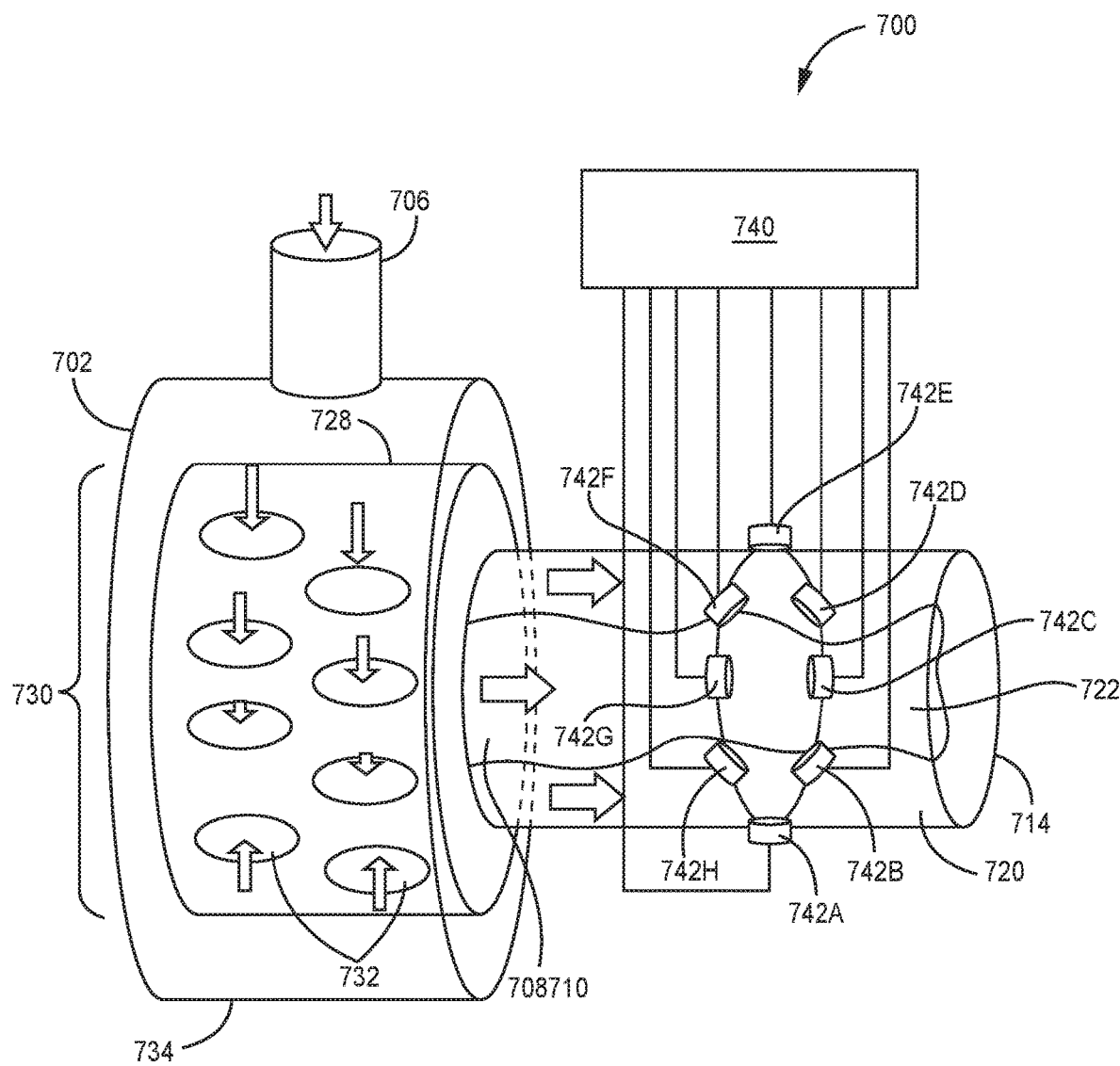
FIG. 7 is a schematic diagram of an inline demulsification system and method, according to one or more embodiments of the invention.

FIG. 7 is a schematic diagram of an inline demulsification system and method 700, according to one or more embodiments of the invention. As shown in FIG. 7, the inline demulsification device 700 may include a plurality of ultrasonic probes 742A, 742B, 742C, 742D, 742E, 742F, 742G arranged in a circular array extending completely (or partially, in other embodiments) around an outer surface of the pipe 714. Each ultrasonic probe 742A, 742B, 742C, 742D, 742E, 742F, 742G may have an independent power source or, as shown, a single power source shared by the other ultrasonic probes. In some embodiments, the one or more ultrasonic probes 742A, 742B, 742C, 742D, 742E, 742F, 742G are excited (e.g., ultrasonic waves are emitted) simultaneously. In some embodiments, the ultrasonic probes 742A, 742B, 742C, 742D, 742E, 742F, 742G are excited (e.g., ultrasonic waves are emitted) in a time multiplexed manner (e.g. a phased array principle). The options for simultaneous excitement and time multiplexed excitement have the advantage of generating balanced high-power ultrasonic waves throughout the whole cross section of the multiphase fluid in annular flow, which may correspondingly prompt the breaking of the emulsion process (e.g., the oil-water separation process).

In some embodiments, the inline demulsification system 700 may include an inline flow conditioner 702. The inline flow conditioner 702 may include a multiphase inlet 706 and a swirl generating device 730 for changing a flow profile of the multiphase fluid, including a gas phase 722 and a liquid phase 720, from a first flow profile to a second flow profile. The swirl generating device 730 may include a hollow rod 728 including one or more, or a plurality, of orifices 732. In some embodiments, the one or more orifices 732 may be referred to as small inclined holes. The hollow rod 728 may be fixed inside a cylindrical compartment 734 having an opening 706 from which it receives the multiphase inflow. The ultrasonic wave device 704 may be provided proximal to an outlet 708 of the inline flow conditioner 702 (e.g., such that the inline flow conditioner 702 is immediately upstream the ultrasonic wave device 704). In some embodiments, the ultrasonic wave device 704 includes one or more ultrasonic probes 742, each of which may be coupled to a generator or power supply 740. The one or more ultrasonic probes 742 may be installed on and/or around an outer perimeter or diameter of a conduit 714 which has an inlet 710 and an outlet 712. The one or more ultrasonic probes 742 may emit one or more ultrasonic waves 750 which may be reflected as reflected ultrasonic waves 752.

Figure 8:
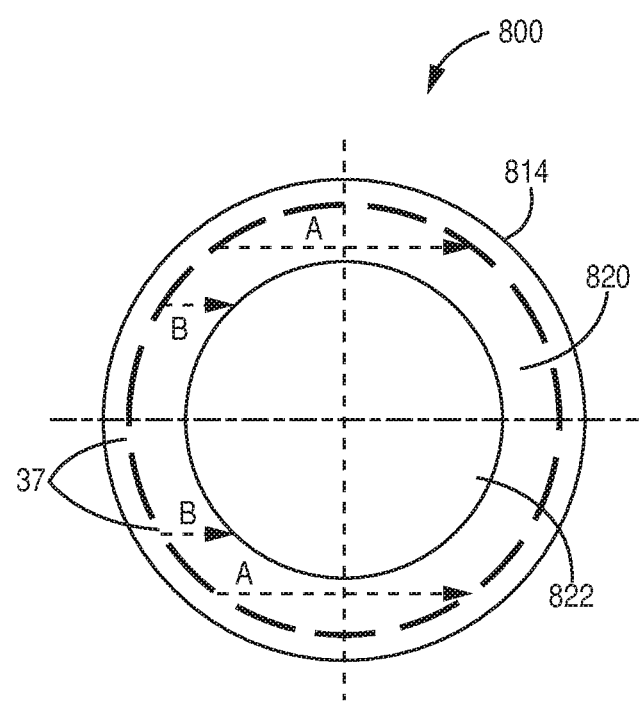
FIG. 8 shows the cross-sectional view of a conduit equipped with at least one ultrasonic probe, according to one or more embodiments of the invention.

FIG. 8 shows the cross-sectional view of a conduit equipped with at least one ultrasonic probe, according to one or more embodiments of the invention. As shown in FIG. 8, the conduit 814 includes a multiphase fluid with an annular flow profile in which a gas phase 822 is surrounded by a liquid phase 820. In some embodiments, depending on the position of the associated ultrasonic probe (not shown), ultrasonic waves generated by the ultrasonic probe can hit the gas phase (e.g., as ultrasonic wave B) or the liquid phase (e.g., as ultrasonic wave A). In some embodiments, the array of ultrasonic probes may include a high intensity focused ultrasonic (e.g., HFIT or HFIU). At least one advantage of HFIT and/or HFIU is that it may be used to focus powerful ultrasonic waves into a single area of interest, facilitating a more efficient use of ultrasonic waves and thus a more efficient emulsion separation process.

Figure 9:
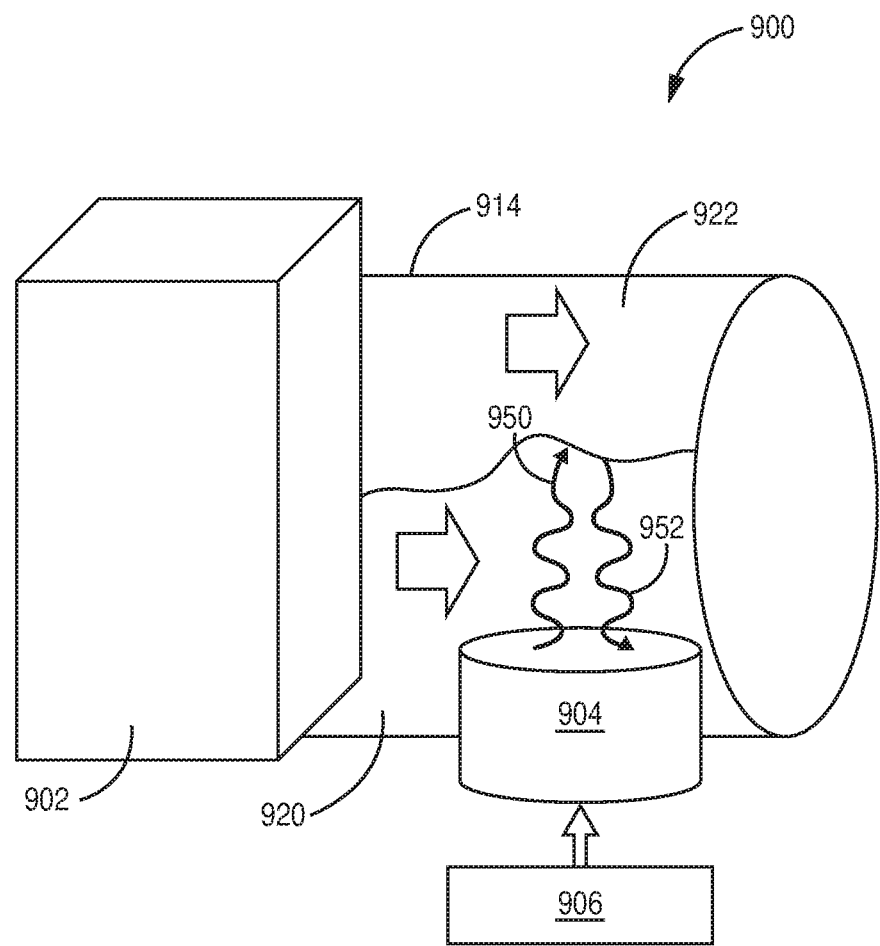
FIG. 9 is a schematic diagram of an inline demulsification system and method, according to one or more embodiments of the invention.

FIG. 9 is a schematic diagram of an inline demulsification system and method 900, according to one or more embodiments of the invention. As shown in the FIG. 9, the inline demulsification system 900 may include an inline flow conditioner 902 for generating a stratified flow in which a liquid phase 920 flows on a bottom side of the pipeline 914 and the gas phase 922 flows in a top side of the pipeline 914. The pipeline 914 may include one or more ultrasonic probes 904 located near the bottom side of the pipeline 914, proximal to the liquid phase 920.

Figure 10:
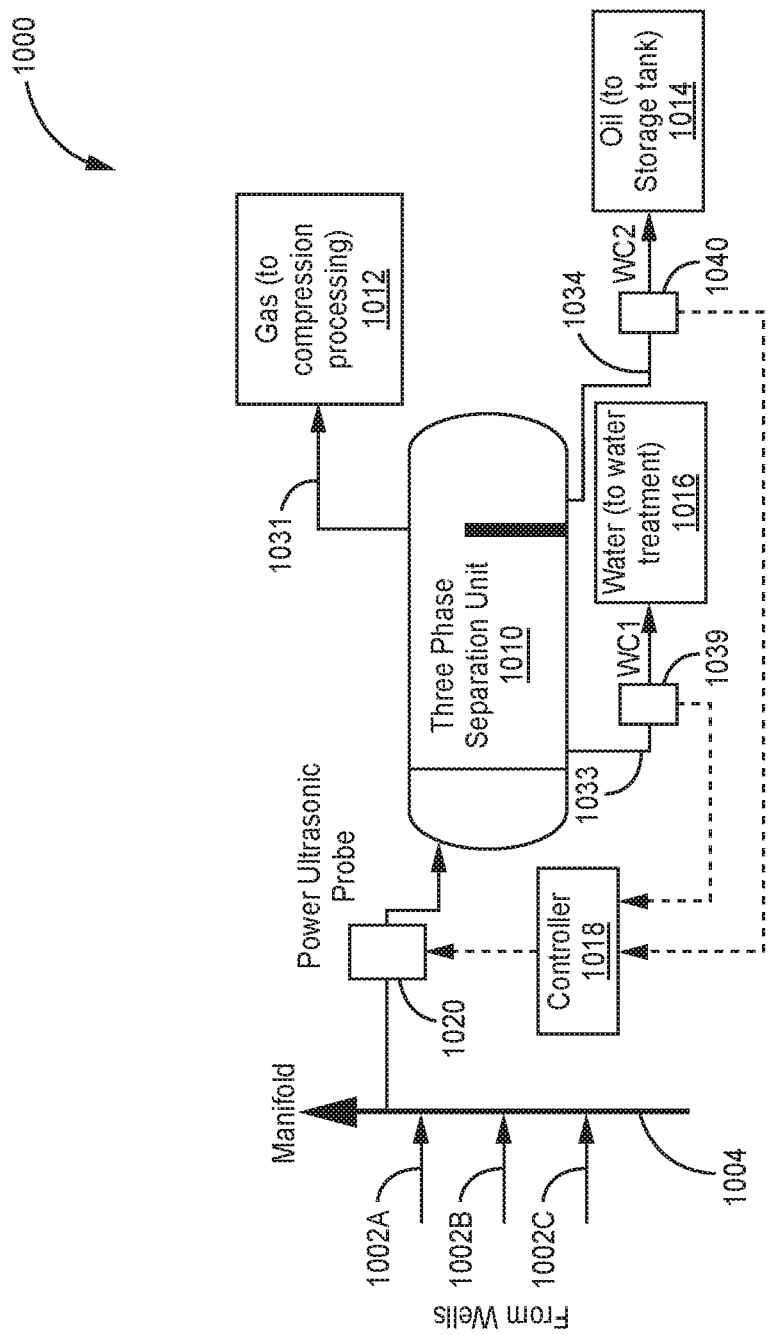
FIG. 10 is a schematic diagram of a portion of an improved gas oil separation system and method, according to one or more embodiments of the invention.

FIG. 10 is a schematic diagram of a portion of an improved gas oil separation system and method, according to one or more embodiments of the invention. As shown in FIG. 10, the improved gas oil separation system and method 1000 includes a manifold 1004 in which crude oil from one or more production wells 1002A, 1002B, 1002C is aggregated or collected into a single channel for distribution to downstream unit operations for processing. A three-phase separation unit 1010 may be fluidly connected to and downstream from the manifold 1004. In some embodiments, the three-phase separation unit 1010 includes a dehydrator unit (not shown), a desalter unit (now shown), and an oil-water separator unit (not shown). A gas stream 1031 may be directed from the three-phase separation unit 1010 to a compression processing unit 1012. An oil stream 1034 may be directed from the three-phase separation unit 1010 to a storage tank 1014. A water or wastewater stream 1033 may be directed from the three-phase separation unit 1010 to a water treatment unit/plant 1016.

In the illustrated embodiment, the inline demulsification system includes an ultrasonic wave device 1020 located upstream from the three-phase separation unit 1010 and downstream from the manifold 1004. The inline demulsification system may further include one or more sensors 1039, 1040, and a controller 1018. For example, in some embodiments, the one or more sensors 1039, 1040 are located downstream from the ultrasonic wave device 1020 and the one or more sensors 1039, 1040 are configured to communicate data representing one or more properties of the multiphase fluid to the controller 1018. In some embodiments, the one or more sensors 1039, 1040 include one or more water-cut sensors for communicating data representing a water-cut of the multiphase fluid to the controller 1018. The controller 1018, in addition to being electrically connected to the one or more sensors 1039, 1040, may also be electrically connected to the ultrasonic wave device 1020. In such a configuration, the intensity (e.g., power, frequency, etc.) of the ultrasonic waves may be tuned in response to inputs from the one or more sensors 1039.

In some embodiments, for example, where the one or more sensors 1039, 1040 include one or more water-cut sensors, data representing the water-cut of one or more of the wastewater stream 1033 and oil stream 1034 may be communicated from said sensors 1039, 1040 to the controller 1018. In response to said data, the controller may adjust the power, intensity, and/or frequency of the ultrasonic waves emitted by the ultrasonic wave device 1020. For example, in some embodiments, the ultrasonic power of the ultrasonic waves emitted by the ultrasonic wave device 1020 may be increased by the controller in response to measurements from the one or more sensors that the amount of oil in the wastewater stream 1033 exceeds a predefined threshold (e.g., indicating that the emulsion is still present in significant amounts). In further embodiments, the ultrasonic power of the ultrasonic waves emitted by the ultrasonic wave device 1020 may be increased by the controller in response to measurements from the one or more sensors that the amount of water in the oil stream 1034 exceeds a predefined threshold (e.g., indicating that the emulsion is still present in significant amounts). Although the ultrasonic wave device may be configured to operate autonomously, it also may be configured to operate in response to real-time measurements and data from one or more sensors, among other things. The concept of using sensors in combination with the ultrasonic wave device, including the inline demulsification devices disclosed herein, may be extended to any portion of a pipeline, including for example and without limitation, desalting units, separation vessels, and the like.

Figure 11:
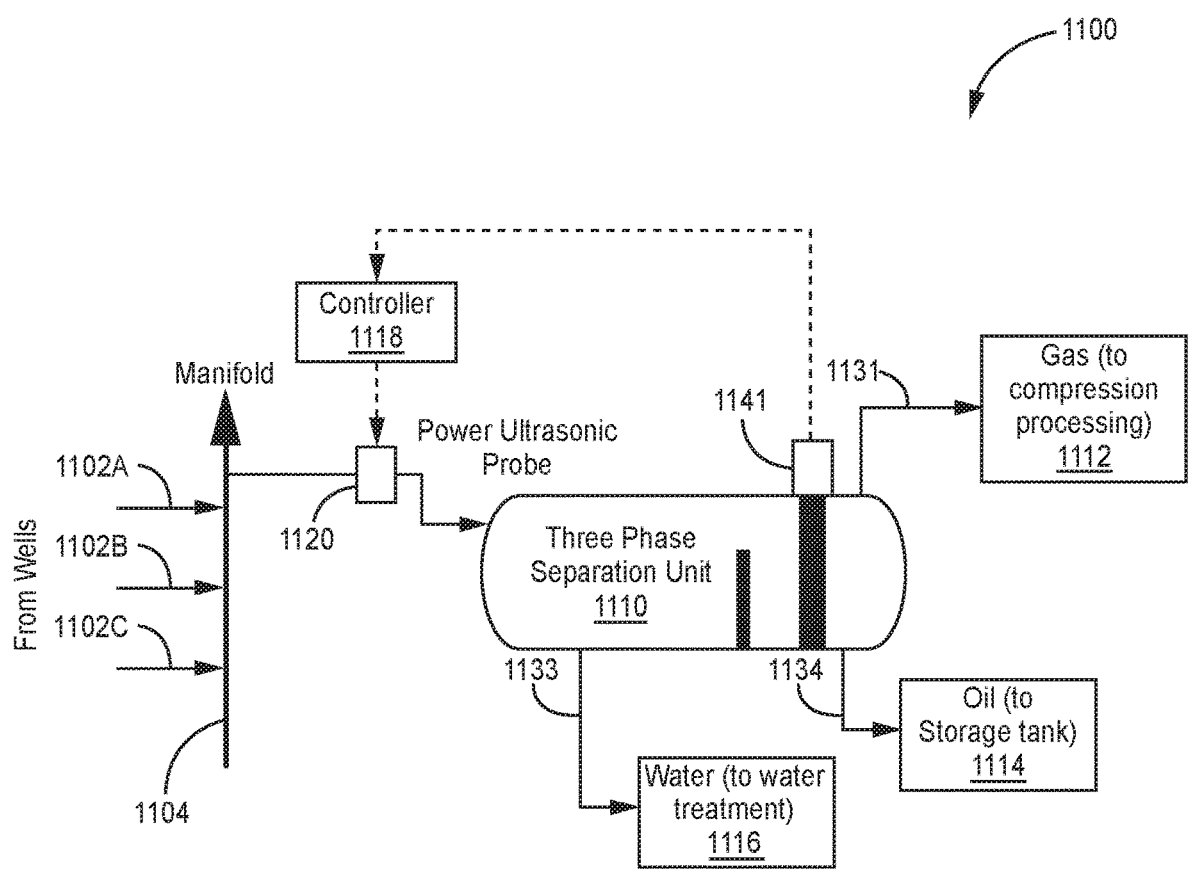
FIG. 11 is a schematic diagram of a portion of an improved gas oil separation system and method, according to one or more embodiments of the invention.

FIG. 11 is a schematic diagram of a portion of an improved gas oil separation system and method, according to one or more embodiments of the invention. As shown in FIG. 11, the improved gas oil separation system and method 1100 includes a manifold 1104 in which crude oil from one or more production wells 1102A, 1102B, 1102C is aggregated or collected into a single channel for distribution to downstream unit operations for processing. A three-phase separation unit 1110 may be fluidly connected to and downstream from the manifold 1104. In some embodiments, the three-phase separation unit 1110 includes a dehydrator unit (not shown), a desalter unit (now shown), and an oil-water separator unit (not shown). A gas stream 1131 may be directed from the three-phase separation unit 1110 to a compression processing unit 1112. An oil stream 1134 may be directed from the three-phase separation unit 1110 to a storage tank 1114. A water or wastewater stream 1133 may be directed from the three-phase separation unit 1110 to a water treatment unit/plant 1116.

In the illustrated embodiment, an inline demulsification system includes an ultrasonic wave device 1120 located upstream from the three-phase separation unit 1110 and downstream from the manifold 1104. The inline demulsification system may further include a sensor probe 1141 and a controller 1118. The sensor probe 1141 may be configured to be immersed into the three-phase separation unit 1110 and to communicate data representing one or more properties of the multiphase fluid in the three-phase separation unit 1110 to the controller 1118. In some embodiments, the sensor probe 1141 includes an emulsion layer sensor probe for communicating data representing an emulsion layer profile to the controller 1118. The controller, in addition to being electrically connected to the sensor probe 1141, may also be electrically connected to the ultrasonic wave device 1120. In such a configuration, one or more parameters of the ultrasonic wave device 1120 (e.g., intensity, power, frequency, etc.) may be adjusted such that the ultrasonic waves are tuned in response to inputs from the sensor probe 1141. For example, the power to be generated by the one or more ultrasonic probes of the ultrasonic wave device 1120 may be adjusted in response to measurements from the sensor probe 1141. In some embodiments, the sensor probe 1141 is immersed in the desalting unit. In some embodiments, the sensor probe 1141 is immersed in the separation vessel.

Figure 12:
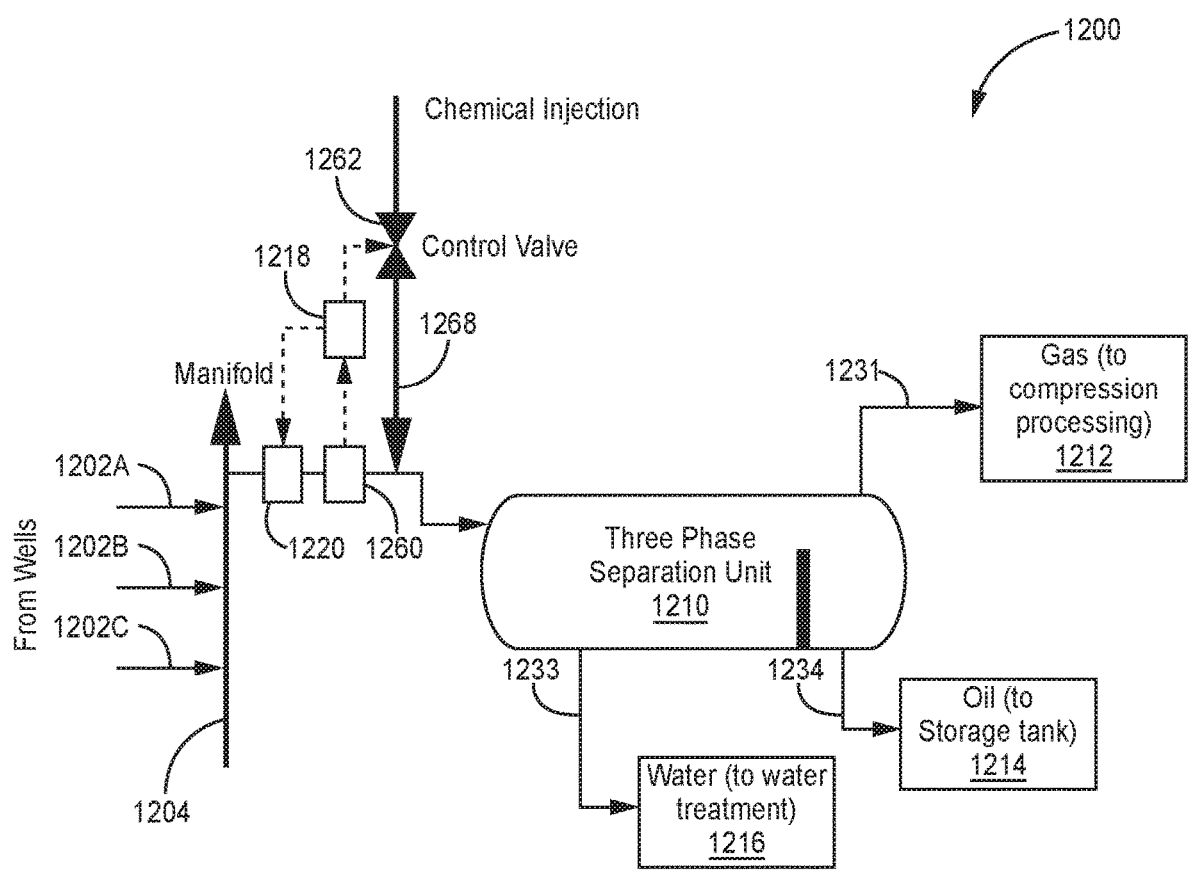
FIG. 12 is a schematic diagram of a portion of an improved gas oil separation system and method, according to one or more embodiments of the invention.

FIG. 12 is a schematic diagram of a portion of an improved gas oil separation system and method, according to one or more embodiments of the invention. As shown in FIG. 12, the improved gas oil separation system and method 1200 includes a manifold 1204 in which crude oil from one or more production wells 1202A, 1202B, 1202C is aggregated or collected into a single channel for distribution to downstream unit operations for processing. A three-phase separation unit 1210 may be fluidly connected to and downstream from the manifold 1204. In some embodiments, the three-phase separation unit 1210 includes a dehydrator unit (not shown), a desalter unit (now shown), and an oil-water separator unit (not shown). A gas stream 1231 may be directed from the three-phase separation unit 1210 to a compression processing unit 1212. An oil stream 1234 may be directed from the three-phase separation unit 1210 to a storage tank 1214. A water or wastewater stream 1233 may be directed from the three-phase separation unit 1210 to a water treatment unit/plant 1216.

In the illustrated embodiment, an ultrasonic wave device 1220 operates in combination with a chemical injection port 1268 and in response to input from an inline water-cut meter or sensor. The inline water-cut sensor may be used to communicate data representing a water-cut, or the amount of water present in an oil stream, to the controller 1218. The controller may be configured to control one or more parameters of the chemical injection port 1268 (e.g., the amount of chemicals to be injected, the frequency or timing of the injection, etc.) and/or the power of the ultrasonic probe of the ultrasonic wave device 1220. For example, the controller may, in response to input from the inline water-cut sensor, control the quantity of chemicals injected into the multiphase fluid via control valve 1262 and/or the power of the ultrasonic waves emitted by the ultrasonic probe of the ultrasonic wave device 1220. In this way, ultrasonic wave device may work simultaneously with the chemical injection facility 1268 where an inline water-cut meter 1260 measures the amount of water in oil to let the controller 1218 control both the quantity of chemicals to inject into the multiphase flow and the power of the ultrasonic probe 1220.

Any of the inline demulsification systems disclosed herein may be utilized in any of the systems and methods disclosed herein, including without limitation, the systems and methods presented in FIGS. 1-12. For example, in some embodiments, one or more inline demulsification systems may be installed or located downstream or upstream from the HPPT unit, downstream or upstream from the LPPT unit, downstream or upstream from the wet crude oil holding unit, downstream or upstream from the dehydrator unit, downstream or upstream from the desalter unit, downstream or upstream from the oil-water separator unit, downstream or upstream from the wastewater vessel unit, downstream or upstream from the stabilizer column, downstream or upstream from the reboiler unit, and/or downstream or upstream from the dry crude oil unit from FIG. 1. This is provided only as an example as this may be extended to each of FIGS. 1-12.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto Various examples have been described. These and other examples are within the scope of the following claims.

What is claimed is:

1. An inline demulsification system comprising:
   an inline flow conditioner for separating a multiphase fluid into a liquid fluid and a gas fluid, wherein the liquid fluid includes an emulsion;
   an ultrasonic wave device, provided downstream from the inline flow conditioner, including one or more ultrasonic probes for emitting ultrasonic waves towards the emulsion, wherein the ultrasonic waves demulsify at least a portion of the emulsion; and
   one or more sensors for communicating data representing one or more properties of the multiphase fluid to a controller, wherein the one or more sensors include one or more water-cut sensors for communicating data representing an amount of oil and/or water present in the multiphase fluid,
   wherein the emulsion includes two or more distinct liquids and the demulsifying includes at least partially destabilizing the two or more distinct liquids.

2. The inline demulsification system of claim 1, wherein the ultrasonic wave device is configurable to be installed on an outer surface of a conduit.

3. The inline demulsification system of claim 1, further including a matching layer positioned between at least one ultrasonic probe and a conduit on which the ultrasonic probe is mounted.

4. The inline demulsification system of claim 1, wherein the ultrasonic wave device generates continuous ultrasonic waves.

5. The inline demulsification system of claim 1, wherein the ultrasonic wave device generates intermittent ultrasonic waves.

6. The inline demulsification system of claim 1, wherein the ultrasonic wave device emits the ultrasonic waves with a frequency of at least 1 KHz.

7. The inline demulsification system of claim 1, wherein the ultrasonic wave device emits the ultrasonic waves with a power exceeding 100 Watts.

8. The inline demulsification system of claim 1, wherein the inline flow conditioner is configured to adjust a flow profile of the multiphase fluid from a first flow profile to a second flow profile.

9. The inline demulsification system of claim 8, wherein the second flow profile includes an annular flow in which the gas fluid is surrounded by the liquid fluid.

10. The inline demulsification system of claim 8, wherein the second flow profile includes a stratified flow in which the gas fluid is above the liquid fluid.

11. The inline demulsification system of claim 1, wherein the controller is configured to control a power of the ultrasonic waves emitted by the one or more ultrasonic probes of the ultrasonic wave device in response to input from the one or more water-cut sensors.

12. The inline demulsification system of claim 11, wherein the power of the ultrasonic waves is increased or decreased if an amount of oil in a water line exceeds a predetermined threshold.

13. The inline demulsification system of claim 11, wherein the power of the ultrasonic waves is increased or decreased if an amount of water in an oil line exceeds a predetermined threshold.

14. The inline demulsification system of claim 1, wherein the controller is configured to control an injection of one or more chemicals in response to input from the one or more water-cut sensors.

15. The inline demulsification system of claim 1, wherein the one or more sensors include one or more emulsion sensor probes for communicating data representing an emulsion layer profile in the multiphase fluid to the controller.

16. The inline demulsification system of claim 11, wherein the controller is configured to control the power of the ultrasonic waves emitted by the ultrasonic wave of the ultrasonic wave device in response to input from one or more emulsion sensor probes.

17. A gas oil separation system comprising: an inline demulsification device including:
   a conduit including an inlet and an outlet;
   an inline flow conditioner including a swirl generating device for separating a multiphase fluid into a liquid fluid and a gas fluid, wherein the liquid fluid includes an emulsion; and
   an ultrasonic wave device, provided downstream from the inline flow conditioner, including one or more ultrasonic probes for emitting ultrasonic waves towards the emulsion, wherein the ultrasonic waves demulsify at least a portion of the emulsion,
   wherein the swirl generating device includes a hollow rod and one or more orifices sufficient for changing a flow profile of the multiphase fluid,
   wherein the emulsion includes two or more distinct liquids and the demulsifying includes at least partially destabilizing the two or more distinct liquids, and
   wherein the inlet is upstream of the inline flow conditioner, the outlet is downstream of the ultrasonic wave device, and a mass flow rate of all fluid at the inlet equals a mass flow rate of all fluid at the outlet.

18. The gas oil separation system of claim 17, wherein the inline demulsification device is located downstream from a manifold and upstream from at least one of a dehydrating unit, a desalting unit, and an oil-water separator unit.

19. The gas oil separation system of claim 17 further comprising one or more sensors for communicating data representing one or more properties of the multiphase fluid to a controller, wherein the one or more sensors include one or more water-cut sensors for communicating data representing an amount of oil and/or water present in the multiphase fluid.

20. The gas oil separation system of claim 17, wherein the hollow rod is fixed inside a cylindrical compartment, and wherein the cylindrical compartment includes the inlet.

* * * * *